(12) United States Patent
Qin et al.

(10) Patent No.: US 9,331,556 B2
(45) Date of Patent: May 3, 2016

(54) BRUSH MOTOR AND COOLING FAN INCORPORATING THE MOTOR

(71) Applicant: Johnson Electric S.A., Murten (CH)

(72) Inventors: Rui Feng Qin, Hong Kong (CN); Ji Yu Liang, Shenzhen (CN); Yan Bing Li, Shenzhen (CN)

(73) Assignee: Johnson Electric S.A., Murten (CH)

( * ) Notice: Subject to any disclaimer, the term of this patent is extended or adjusted under 35 U.S.C. 154(b) by 507 days.

(21) Appl. No.: 13/710,853

(22) Filed: Dec. 11, 2012

(65) Prior Publication Data

US 2013/0147312 A1 Jun. 13, 2013

(30) Foreign Application Priority Data

Dec. 12, 2011 (CN) .......................... 2011 1 0413932

(51) Int. Cl.
*H02K 13/00* (2006.01)
*H02K 13/04* (2006.01)

(52) U.S. Cl.
CPC .............. *H02K 13/006* (2013.01); *H02K 13/04* (2013.01)

(58) Field of Classification Search
CPC ...... H01R 39/04; H01R 39/045; H02K 13/00; H02K 13/006; H02K 13/04; H02K 13/06; H02K 13/08; H02K 13/10; H02K 27/00
USPC ........ 417/410–422, 423.1–423.14; 310/40 R, 310/127, 128, 173, 159, 261.1, 58, 62, 63, 310/219–240
See application file for complete search history.

(56) References Cited

U.S. PATENT DOCUMENTS

| | | | | |
|---|---|---|---|---|
| 4,120,616 A * | 10/1978 | Dwyer et al. | ................. | 417/373 |
| 4,156,168 A * | 5/1979 | Vogel | ....................... | 318/400.26 |
| 4,360,751 A * | 11/1982 | Arnold et al. | ............... | 310/60 R |
| 6,170,146 B1 * | 1/2001 | Katagiri | ................. | H01R 43/06 |
| | | | | 29/597 |
| 6,477,763 B1 * | 11/2002 | Santander | ................ | H02K 3/12 |
| | | | | 156/172 |
| 6,563,245 B1 * | 5/2003 | Suzuki et al. | .................... | 310/91 |
| 6,679,771 B2 * | 1/2004 | Lee | ................. | 454/184 |
| 7,375,452 B2 * | 5/2008 | Kuechen et al. | .............. | 310/233 |
| 7,859,164 B2 * | 12/2010 | Qin et al. | ............... | 310/216.071 |
| 2005/0275307 A1 * | 12/2005 | Chavez | .......................... | 310/261 |
| 2008/0203847 A1 * | 8/2008 | Ito | .......................... | H01R 39/06 |
| | | | | 310/234 |
| 2009/0058210 A1 * | 3/2009 | Qin et al. | ....................... | 310/179 |
| 2009/0167120 A1 * | 7/2009 | Kato et al. | .................. | 310/60 R |

FOREIGN PATENT DOCUMENTS

| | | | | |
|---|---|---|---|---|
| CN | 102545485 | 7/2012 | | |
| DE | 20004797 U1 * | 8/2000 | ............... | H02K 1/22 |
| DE | 102004036967 | 2/2005 | | |

* cited by examiner

*Primary Examiner* — Naishadh Desai

(74) *Attorney, Agent, or Firm* — Muncy, Geissler, Olds & Lowe, P.C.

(57) ABSTRACT

A brush motor includes a stator and a rotor. The stator includes multiple magnets attached to an inner surface of a stator housing and a brush assembly fixed relative to the housing. The rotor includes a rotor core and a commutator located in a receiving space defined by a mounting portion and an annular sidewall of the rotor core. The commutator includes multiple conductive segments, each of which has a leg penetrating the rotor core and connected with windings on the rotor core.

16 Claims, 5 Drawing Sheets

BRUSH MOTOR AND COOLING FAN INCORPORATING THE MOTOR

CROSS REFERENCE TO RELATED APPLICATIONS

This non-provisional patent application claims priority under 35 U.S.C. §119(a) to Patent Application No. 201110413932.5 filed in The People's Republic of China on Dec. 12, 2011.

FIELD OF THE INVENTION

This invention generally relates to a brush motor and specifically to a brush motor with compact shaft design and a cooling fan incorporating such a brush motor.

BACKGROUND OF THE INVENTION

A brush motor includes a stator, a rotor, and an end cap. The rotor includes an shaft with a rotor core and a commutator fixed thereon. Windings are wound on the rotor core and terminated at the commutator. Typically, the rotor core and the commutator are located side by side on the shaft with a distance defined there between. Such design elongates an axial length of the motor, and as a result, the motor is not suitable in miniaturization applications that requires a short axial length, such as cooling fans in certain automobiles.

Therefore, there is a desire for an improved motor that can overcome the above described shortcomings. Specifically, it is desirable to have a compact motor design with a short shaft for such applications as automobile cooling fans.

SUMMARY OF THE INVENTION

Accordingly, in one aspect thereof, the present invention provides a brush motor, comprising: a stator comprising: a housing having a first end and a second end; and a plurality of magnets attached to an inner surface of the housing; a brush assembly fixed with respect to the stator and disposed at the first end of the housing; and a rotor disposed in the housing of the stator and comprising: a shaft; a rotor core fixed to said shaft and including an annular sidewall and a mounting portion having a plurality of through holes therein adjacent the sidewall, the annular sidewall and the mounting portion defining a receiving space; a commutator located in the receiving space of the rotor core and including a plurality of conductive segments substantially parallel to the annular sidewall, each of the plurality of conductive segments having a leg penetrating the mounting portion of the rotor core through a corresponding through hole; and windings wound on the rotor core and electrically coupled to the commutator.

According to a second aspect thereof, the present invention provides a brush motor, comprising: a rotor disposed comprising: a shaft; a rotor core fixed to said shaft and including an annular sidewall having a plurality of teeth extending there from and a mounting portion having a plurality of through holes therein adjacent the sidewall, the annular sidewall and the mounting portion defining a receiving space; a commutator located in the receiving space of said rotor core and including a plurality of conductive segments substantially parallel to the annular sidewall, each of the plurality of conductive segments having a leg penetrating the mounting portion of said rotor core through a corresponding through hole; and windings wound on the plurality of teeth extending from said annular sidewall of said rotor core and electrically coupled to said commutator; a stator comprising: a housing surrounding said rotor core having a first end and a second end; and a plurality of magnets attached to an inner surface of said housing; and a brush assembly stationary disposed at the first end of said housing and including a plurality of brushes located in the receiving space of said rotor core and in slidable contact with the conductive segments of said commutator.

According to a third aspect thereof the present invention provides a cooling fan module, comprising an impeller and a motor, said motor including: a rotor disposed comprising: a shaft mechanically coupled to said impeller; a rotor core fixed to said shaft and including an annular sidewall having a plurality of teeth extending there from and a mounting portion having a plurality of through holes therein adjacent the sidewall, the annular sidewall and the mounting portion defining a receiving space; a commutator located in the receiving space of said rotor core and including a plurality of conductive segments substantially parallel to the annular sidewall, each of the plurality of conductive segments having a leg penetrating the mounting portion of said rotor core through a corresponding through hole; and windings wound on the plurality of teeth extending from said annular sidewall of said rotor core and electrically coupled to said commutator; a stator comprising: a housing surrounding said rotor core having a first end and a second end; a first end cap attached to the first end of said housing and having a first bearing coupled to a first portion of said shaft; a second end cap attached the second end of said housing and having a second bearing coupled to a second portion of said shaft; and a plurality of magnets attached to an inner surface of said housing; and a brush assembly stationary disposed on said first end cap and including a plurality of brushes located in the receiving space of said rotor core and in slidable contact with the conductive segments of said commutator.

Preferably, the rotor core includes a plurality of teeth extending from an outer periphery of the annular sidewall and the windings are wound on the plurality of teeth.

Preferably, the mounting portion of the rotor core is integrally form with the annular sidewall of the rotor core of the rotor.

Preferably, the through holes in the mounting portion are substantially equidistantly spaced in a circle near the annular sidewall of said rotor core.

Preferably, the commutator includes an insulating frame; each of the plurality of conductive segments includes a contact portion fixed to the insulating frame; and the leg of each of the plurality of conductive segments extends from the contact portion.

Preferably, the insulating frame of the commutator is attached to an inner surface of the annular sidewall of the rotor core.

Alternatively, the commutator is fixed to said shaft of said rotor, preferably by way of the insulating frame.

Preferably, the insulating frame of said commutator includes a plurality of tabs extending through the through holes in the mounting portion of said rotor core and insulating the legs of the plurality of conductive segments from said rotor core.

Preferably, the commutator is entirely received in the receiving spaced defined by the annular sidewall and mounting portion of said rotor core.

Preferably, the stator includes a first end cap and a second end cap attached to the housing, and the brush assembly is attached to the said first end cap.

BRIEF DESCRIPTION OF THE DRAWINGS

Preferred embodiments of the present invention will now be described, by way of example only, with reference to figures of the accompanying drawings, in which identical or related structures, elements or parts may be labeled with the same reference numerals throughout the figures. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
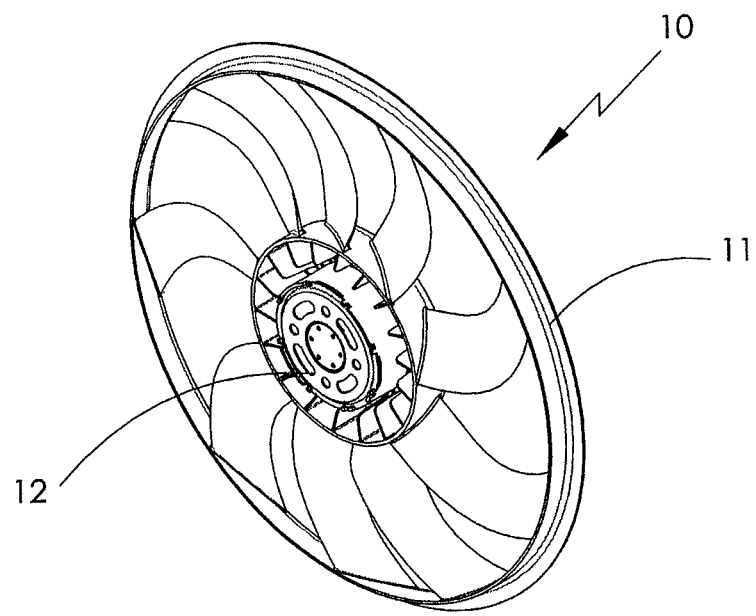
FIG. 1 is an isometric view of a cooling fan according to an exemplary embodiment of the present invention.
Figure 2:
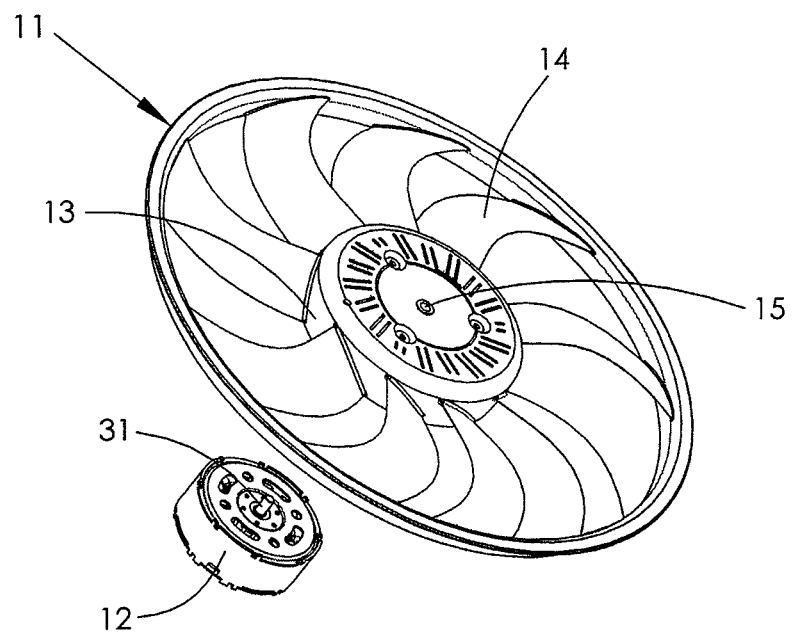
FIG. 2 is a partially exploded view of the cooling fan of FIG. 1.

Referring to FIGS. 1 and 2, a cooling fan 10 includes an impeller 11 and a motor 12 for rotating the impeller. In accordance with the preferred embodiment of the present invention, motor 12 is a brush motor with an shaft 31 extending outside a casing thereof. Impeller 11 includes a hub 13 and a plurality of blades 14 extending radially from a periphery of hub 13. Hub 13 defines a mounting hole 15 therein in which the shaft is a press fit, such that impeller 11 rotates integrally with shaft 31 of the motor 12.

Figure 3:
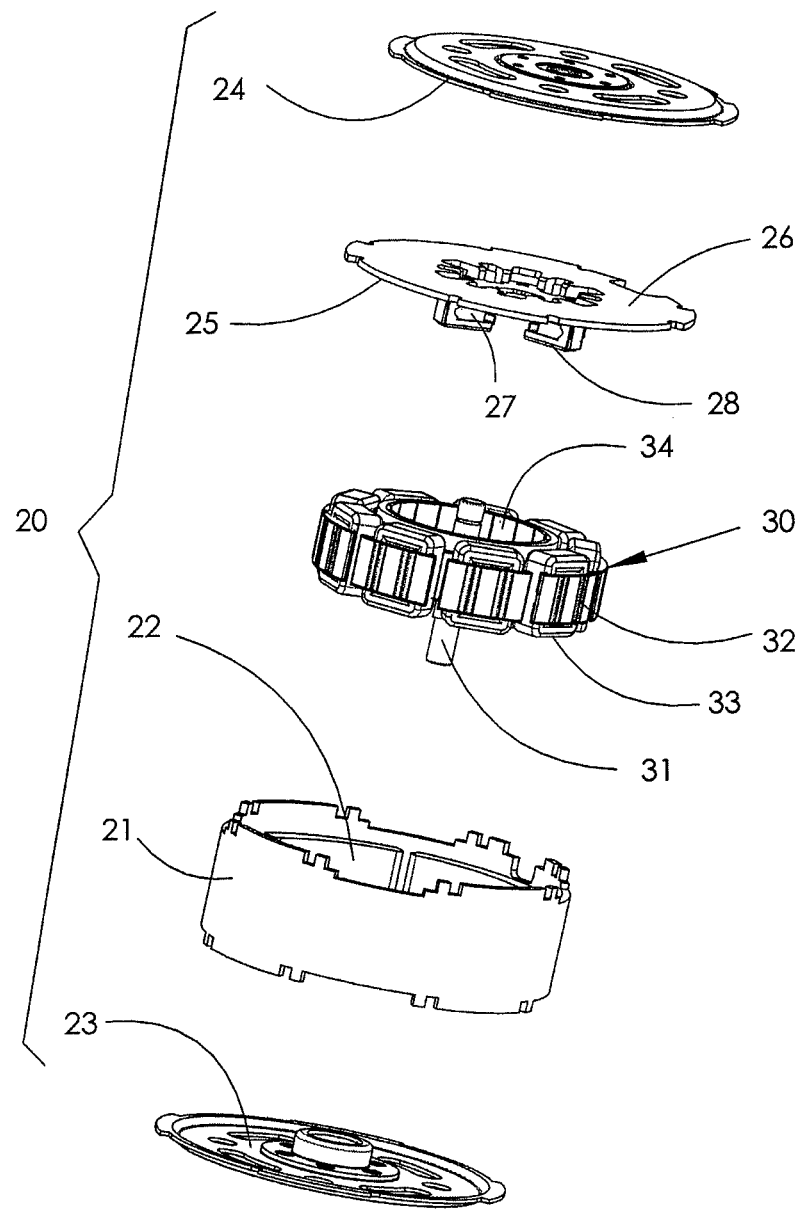
FIG. 3 is an exploded view of a brush motor that may be used in the cooling fan shown in FIG. 2.
Figure 4:
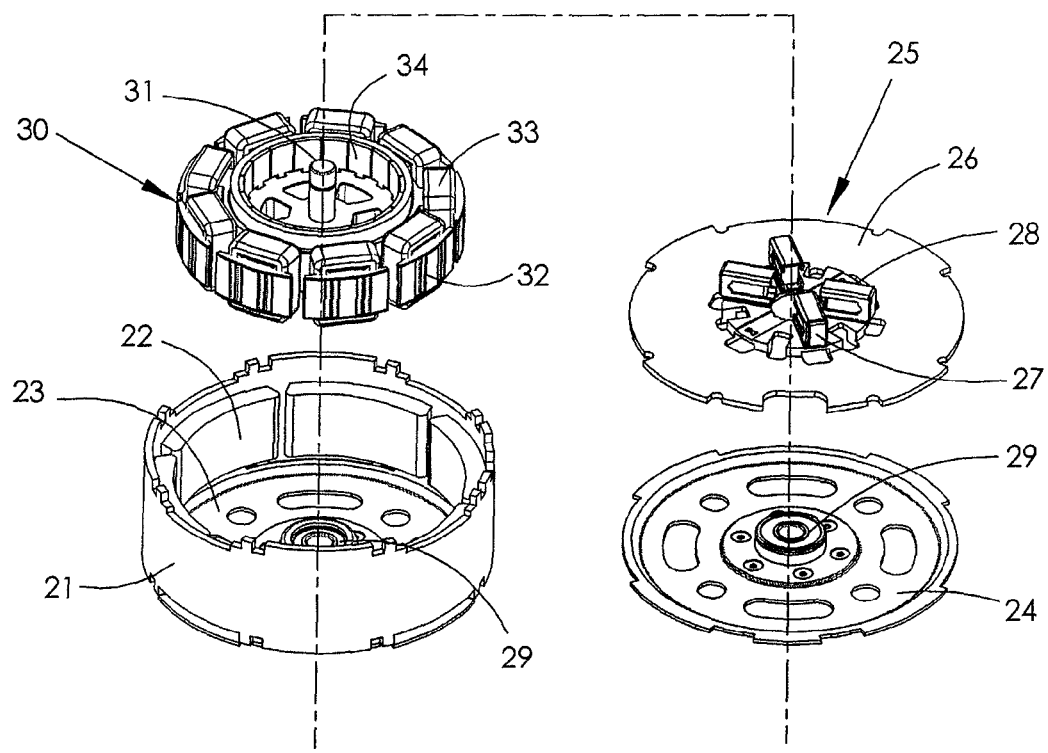
FIG. 4 illustrates the brush motor of FIG. 3, viewed from another aspect.

Referring also to FIGS. 3 and 4, motor 12 includes a stator 20, a rotor 30 and brush assembly 25. Stator 20 includes a housing 21 with two openings defined at two opposite axial ends, a plurality of magnets 22 attached to an inner surface of housing 21, and two end caps 23 and 24 covering the two opening of housing 21. The brush assembly 25 is fixed relative to housing 21. Preferably, brush assembly 25 is mounted to end cap 24, and includes a base 26 and a plurality of brushes 27 mounted on base 26. In accordance with a specific embodiment, base 26 is in the form of a circular disk attached to an inner axial surface of end cap 24. Each brush 27 is received in a respective brush holder 28 that can be mounted on base 26 or integrally formed with base 26 as a monolithic construction by injection molding.

Rotor 30 is rotatably disposed in housing 21 of the stator 20 with the ends of shaft 31 supported by bearings 29 on the end caps 23 and 24. Rotor 30 includes a rotor core 32 fixed to shaft 31, windings 33 wound on rotor core 32, and a commutator 34.

Figure 5:
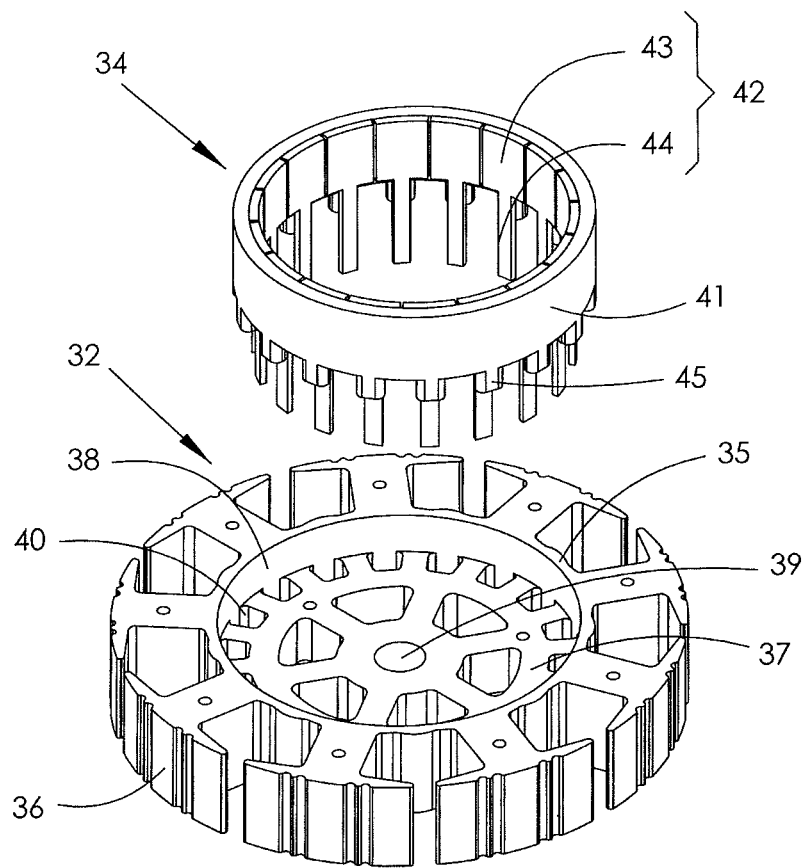
FIG. 5 illustrates the rotor core and the commutator of the brush motor shown in FIGS. 3 and 4, wherein the rotor core and the commutator are in an unassembled state.
Figure 6:
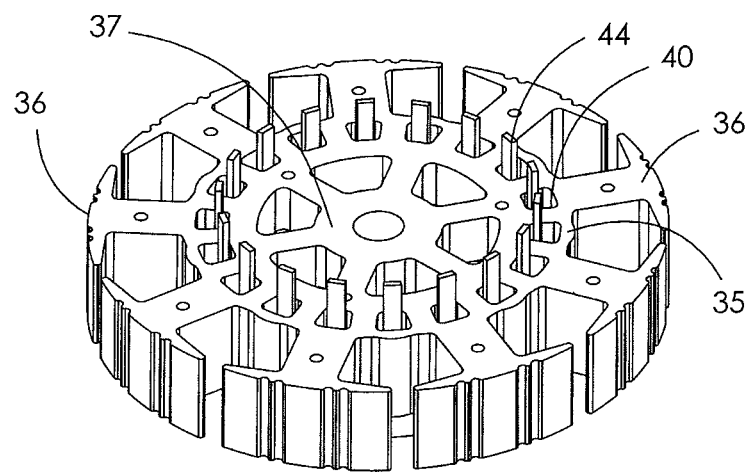
FIG. 6 is an assembled view of the rotor core and the commutator of FIG. 5, viewed from below.

Referring to FIGS. 5 and 6, rotor core 32 is made by stacking together a plurality of laminations formed of magnetic material. The laminations form an annular sidewall 35 and a plurality of teeth 36 extending from an outer periphery of the annular sidewall 35. The rotor core also has a bottom or a mounting portion 37 formed in a central area of the annular sidewall 35. Mounting portion 37 has an axial length less than that of annular sidewall 35. The central area of annular sidewall 35 and mounting portion 37 defines a receiving space 38, with mounting portion 37 forming a bottom of the receiving space. In accordance with an embodiment of the present invention, mounting portion 37 is integrally formed as a part of the rotor core laminations. Preferably, a number of the laminations of the rotor core extend inwardly to the shaft, forming the mounting portion and other laminations extend inwardly only to and form the inner surface of the annular sidewall. Mounting portion 37 defines a mounting hole 39 for fixing the rotor core to shaft 31. Mounting portion 37 further defines a plurality of through holes 40 that are equidistantly spaced in the circumferential direction of the rotor core such that the holes are formed on a circle coaxial with the annular sidewall and having a radius less than the radius of the annular sidewall.

Commutator 34 includes an insulating frame 41 and a plurality of conductive segments 42 fixed to frame 41. Frame 41 is substantially cylindrical, and conductive segments 42 are equidistantly attached to an inner surface of frame 41 along a circumferential direction of frame 41. Each segment 42 includes a contact portion 43 and a leg 44 extending from one axial end of contact portion 43. Segments 42 can be undetachably formed in frame 41 by insertion molding, with leg 44 and an radial inner surface of contact portion 43 exposed. Preferably, frame 41 forms a plurality of tabs 45 with each tab corresponding to a respective leg 44. A length of tab 45 in an axial direction of the commutator 34 is less than that of leg 44 along the same direction.

During assembly, commutator 34 is positioned in receiving space 38 of rotor core 32, with an outer periphery of commutator 34 attached to an inner periphery of annular sidewall 35 of the rotor core 32. Legs 44 of commutator 34 penetrate respective through holes 40 in mounting portion 37 and protrude out of rotor core 32 to electrically connect to windings 33. Tabs 45 of frame 41 also extend in corresponding through holes 40 and insulate legs 44 from rotor core 32. In accordance with the present invention, positioning commutator 34 in receiving space 38 of rotor core 32 significantly reduces a total axial length of rotor 30.

Figure 7:
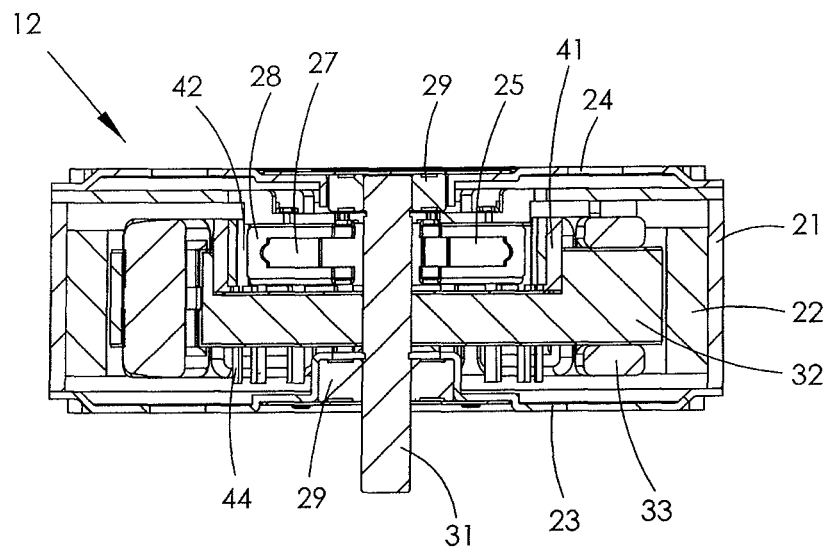
FIG. 7 is a cross sectional view of the brush motor of the cooling fan of FIG. 2.

Referring to FIG. 7, after assembling, rotor 30 is positioned in stator 20, and two ends of shaft 31 are supported by bearings 29 fixed in end caps 23 and 24. An air gap between magnets 22 of stator 20 and teeth 36 of rotor 30 allows rotor 30 to rotate with respect to stator 20. Brushes 27 are located in receiving space 38 of rotor core 32 to make sliding contact with contact portions 43 of commutator 34 when rotor 30 rotates, by urging forces of resilient elements, such as springs, in brush holders 28 (not shown in the drawings).

Figure 8:
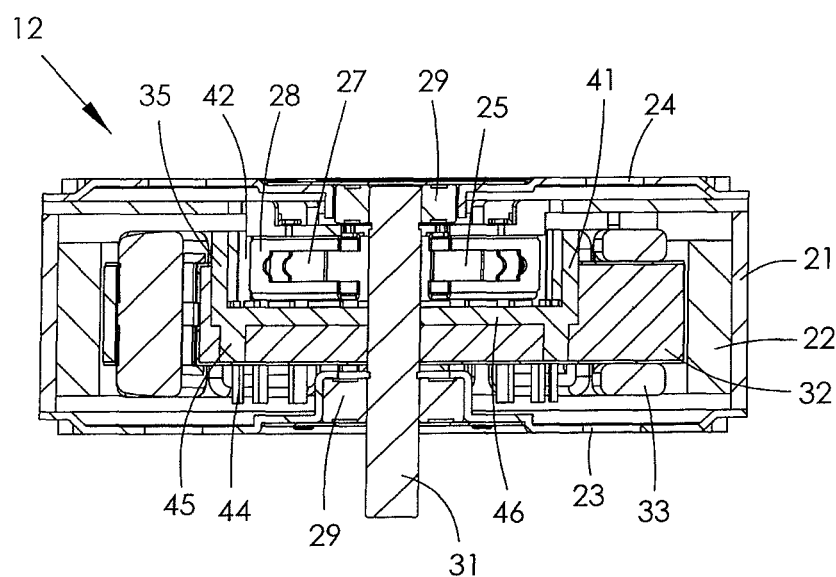
FIG. 8 is a cross sectional view, similar to FIG. 7, illustrating a modified commutator.

Alternatively, as shown in FIG. 8, the insulating frame 41 may have a radially extending flange that is a press fit of the shaft. The tabs 45 are formed on a face of the flange remote from the commutator segments and extend through the through holes 40 of the mounting portion of the rotor core to insulate the legs from the rotor core. This arrangement also prevents the commutator from rotating with respect to the rotor core.

By now, it should be appreciated that a brush motor with a compact shaft has been provided. In accordance with the present invention, the brush motor has a rotor core with an annular sidewall forming a receiving space. The rotor windings are wound on the teeth on the exterior surface of the annular sidewall. The commutator is located in the receiving space. The commutator has legs that pass through holes in a mounting portion of the rotor core forming a bottom of the receiving space, to be coupled to the windings. Such a design with a commutator in the receiving space enables a short shaft design that is beneficial in compact motor designs and applications. By way of example, such a compact shaft motor design is beneficial in the design of a cooling fan module for certain automobiles with limited engine compartment space.

Although the invention is described with reference to one or more preferred embodiments, it should be appreciated by those skilled in the art that various modifications are possible. Therefore, the scope of the invention is to be determined by reference to the claims that follow.

For example, although the motor has been shown as having the commutator only partially received in the receiving space of the rotor core, the commutator may be entirely disposed within the receiving space defined by the annular sidewall and mounting portion of the rotor core.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A brush motor, comprising:
   a stator comprising:
      a housing having a first end and a second end; and
      a plurality of magnets attached to an inner surface of the housing;
   a brush assembly fixed with respect to the stator and disposed at the first end of the housing; and
   a rotor disposed in the housing of the stator and comprising:
      a shaft;
      a rotor core fixed to said shaft and including an annular sidewall and a mounting portion having a plurality of through holes axially extending there through, the annular sidewall and the mounting portion defining a receiving space, wherein the through holes are arranged along an inner circumference of the sidewall;
      a commutator located in the receiving space of the rotor core and including a plurality of conductive segments substantially parallel to the annular sidewall, each of the plurality of conductive segments having a leg penetrating the mounting portion of the rotor core through a corresponding through hole; and
      windings wound on the rotor core and electrically coupled to the commutator,
   wherein said commutator includes an insulating frame, each of the plurality of conductive segments includes a contact portion fixed to the insulating frame, and the leg of each of the plurality of conductive segments extends from the contact portion,
   wherein the insulating frame of said commutator is attached to an inner surface of said annular sidewall of said rotor core, the insulating frame of said commutator includes a plurality of tabs corresponding to the legs of the plurality of conductive segments, each tab extending through a corresponding through hole in the mounting portion of said rotor core together with a corresponding leg and insulating the corresponding leg from said rotor core.

2. The brush motor of claim 1, wherein said rotor core includes a plurality of teeth extending from an outer periphery of the annular sidewall and the windings are wound on the plurality of teeth.

3. The brush motor of claim 1, wherein the mounting portion of said rotor core is integrally formed with the annular sidewall of said rotor core of said rotor.

4. The brush motor of claim 1, wherein the through holes in the mounting portion are substantially equidistantly spaced.

5. The brush motor of claim 1, wherein said commutator is fixed to said sidewall of said rotor core of said rotor.

6. The brush motor of claim 1, wherein said commutator is entirely received in the receiving spaced defined by the annular sidewall and mounting portion of said rotor core.

7. The brush motor of claim 1, wherein said stator includes a first end cap and a second end cap attached to said housing, and said brush assembly is attached to said first end cap.

8. A brush motor, comprising:
   a rotor disposed comprising:
      a shaft;
      a rotor core fixed to said shaft and including a mounting portion mounted to the shaft, and an annular sidewall surrounding the mounting portion and having a plurality of teeth extending there from, the mounting portion having a plurality of through holes axially extending there through, the annular sidewall and the mounting portion defining a receiving space communicating with the through holes;
      a commutator located in the receiving space of said rotor core and including a plurality of conductive segments substantially parallel to the annular sidewall, each of the plurality of conductive segments having a leg penetrating the mounting portion of said rotor core through a corresponding through hole; and
      windings wound on the plurality of teeth extending from said annular sidewall of said rotor core and electrically coupled to said commutator,
   a stator comprising:
      a housing surrounding said rotor core having a first end and a second end; and
      a plurality of magnets attached to an inner surface of said housing; and
      a brush assembly stationary disposed at the first end of said housing and including a plurality of brushes located in the receiving space of said rotor core and in slidable contact with the conductive segments of said commutator,
   wherein said commutator includes an insulating frame having a plurality of tabs extending through the through holes, each tab located between a corresponding leg and an inner periphery of a corresponding through hole and insulating the corresponding leg from said rotor core.

9. The brush motor of claim 8, wherein the insulating frame of said commutator is attached to an inner surface of said annular sidewall of said rotor core.

10. The brush motor of claim 8, wherein said commutator is fixed to said shaft of said rotor via said insulating frame.

11. The brush motor of claim 8, wherein said stator includes a first end cap and a second end cap attached to said housing; and said brush assembly is attached to said first end cap.

12. A cooling fan module, comprising an impeller and a motor, said motor including:
   a rotor disposed comprising:
      a shaft mechanically coupled to said impeller;
      a rotor core including a mounting portion fixed to said shaft and an annular sidewall extending radially and axially from the mounting portion, the mounting portion having a plurality of through holes axially extending there through and arranged along an inner circumference of the annular sidewall, the annular sidewall and the mounting portion defining a receiving space;
      a commutator located in the receiving space of said rotor core and including a plurality of conductive segments substantially parallel to the annular sidewall, each of the plurality of conductive segments having a leg penetrating the mounting portion of said rotor core through a corresponding through hole; and windings wound on the plurality of teeth extending from said annular sidewall of said rotor core and electrically coupled to said commutator;

a stator comprising:

a housing surrounding said rotor core having a first end and a second end;

a first end cap attached to the first end of said housing and having a first bearing coupled to a first portion of said shaft;

a second end cap attached the second end of said housing and having a second bearing coupled to a second portion of said shaft; and a plurality of magnets attached to an inner surface of said housing; and a brush assembly stationary disposed on said first end cap and including a plurality of brushes located in the receiving space of said rotor core and in slidable contact with the conductive segments of said commutator.

13. The cooling fan module of claim 12, wherein said commutator in said motor includes an insulating frame having a plurality of tabs corresponding to the legs of the plurality of conductive segments and extending through the through holes respectively, and each tab separates a corresponding leg from an inner periphery of a corresponding through hole.

14. The cooling fan module of claim 13, wherein the insulating frame of said commutator is attached to an inner surface of said annular sidewall of said rotor core.

15. The cooling fan module of claim 13, wherein said commutator is fixed to said shaft of said rotor by way of said insulating frame.

16. The cooling fan module of claim 12, wherein said commutator and said brush assembly are entirely received in the receiving space defined by the annular sidewall and mounting portion of said rotor core in said motor.

* * * * *